(12) United States Patent
Marquette et al.

(10) Patent No.: US 8,023,635 B2
(45) Date of Patent: Sep. 20, 2011

(54) SYSTEMS AND METHODS TO REDIRECT AUDIO BETWEEN CALLERS AND VOICE APPLICATIONS

(75) Inventors: Brian Marquette, Longmont, CO (US); Michael Clark, Boulder, CO (US); Charles Corfield, Boulder, CO (US)

(73) Assignee: nVoq Incorporated, Boulder, CO (US)

( * ) Notice: Subject to any disclaimer, the term of this patent is extended or adjusted under 35 U.S.C. 154(b) by 0 days.

(21) Appl. No.: 12/694,115

(22) Filed: Jan. 26, 2010

(65) Prior Publication Data

US 2010/0131271 A1 May 27, 2010

Related U.S. Application Data

(63) Continuation of application No. 11/672,394, filed on Feb. 7, 2007, now Pat. No. 7,702,093.

(60) Provisional application No. 60/771,275, filed on Feb. 8, 2006.

(51) Int. Cl.
*H04M 3/00* (2006.01)
*H04M 3/42* (2006.01)

(52) U.S. Cl. .......... 379/265.02; 379/265.01; 379/212.01

(58) Field of Classification Search ............. 379/212.01, 379/265.02, 265.01
See application file for complete search history.

(56) References Cited

U.S. PATENT DOCUMENTS

| | | |
|---|---|---|
| 6,510,414 B1 | 1/2003 | Chaves |
| 7,346,151 B2 | 3/2008 | Erhart et al. |
| 2002/0169606 A1 | 11/2002 | Bantz et al. |
| 2008/0037534 A1 | 2/2008 | Shina |

FOREIGN PATENT DOCUMENTS

EP 1492083 A1 12/2004

OTHER PUBLICATIONS

International Search Authority "Notification of Transmittal of the International Search Report and The Written Opinion of the International Searching Authority, or the Declaration", Sep. 12, 2008.
International Bureau Notification Concerning Transmittal of International Preliminary Report on Patentability (Chapter I of the Patent Cooperation Treaty) Oct. 9, 2008.
European Search Report received for 07763139.8 dated Dec. 8, 2009.

*Primary Examiner* — Rasha Al Aubaidi
(74) *Attorney, Agent, or Firm* — Holland & Hart LLP (57) ABSTRACT

A call center environment is provided that allows a customer service representative to populate a workstation display screen with data using either keystrokes or voice input. The voice input is provided to the workstation using a voice overlay and voice platform to convert audio into data usable by the workstation to populate the screen.

15 Claims, 6 Drawing Sheets

SYSTEMS AND METHODS TO REDIRECT AUDIO BETWEEN CALLERS AND VOICE APPLICATIONS

CROSS-REFERENCE TO RELATED APPLICATIONS AND PRIORITY

This application is a continuation of U.S. patent application Ser. No. 11/672,394, titled SYSTEMS AND METHODS TO REDIRECT AUDIO BETWEEN CALLERS AND VOICE APPLICATION, filed Feb. 7, 2007, now U.S. Pat. No. 7,702,093 incorporated herein by reference as if set out in full, which claims priority to United States Provisional Patent Application Serial Number 60/771,275, titled SYSTEMS AND METHODS TO REDIRECT AUDIO BETWEEN CALLERS AND VOICE APPLICATION, filed Feb. 8, 2006, incorporated herein by reference as if set out in full.

STATEMENT REGARDING FEDERALLY SPONSORED RESEARCH

The present application has not been funded by the United States Government.

FIELD OF THE INVENTION

The present invention relates to customer service calls and, more particularly, to systems and methods to redirect audio between callers to a voice application.

BACKGROUND OF THE INVENTION

Many businesses use customer call centers, whether virtual or brick and mortar, to service their customer base. In these call centers, a customer frequently calls into the center and a customer service representative (CSR or an operator) answers the call. The CSR often asks a series of questions and enters the information into a graphical user interface (GUI) located at the CSR's workstation for use by the customer relationship management applications (CRM applications or applications). For example, the CSR may ask for a product serial number, the customer provides the number, and substantially simultaneously, the CSR enters the numbers into the applications through the GUI.

Manual entry of the information leaves much to be desired. For example, the operator frequently needs the customer to repeat the information. The operator may make an error inputting the information whether or not the customer repeats the information. The entry of information from the customer is error prone and time consuming.

Against this background, it would be desirous to develop improved systems and methods to enter data to the applications.

SUMMARY OF THE INVENTION

The foregoing and other features, utilities and advantages of the invention will be apparent from the following more particular description of a preferred embodiment of the invention as illustrated in the accompanying drawings.

BRIEF DESCRIPTION OF THE DRAWINGS

The accompanying drawings, which are incorporated in and constitute a part of this specification, illustrate embodiments of the present invention, and together with the description, serve to explain the principles thereof. Like items in the drawings are referred to using the same numerical reference.

DETAILED DESCRIPTION

Voice automation can improve CSR productivity by speeding up and reducing errors associated with data entry in applications. Voice automation improves efficiency because generally it takes less time to speak a command, location, or data value than to enter the same with a keyboard, mouse, touch screen, or the like. While the savings per data entry are small, the total time and cost saving for multiple tasks over an extended period of time can become significant.

While voice automation may provide significant time and cost savings, most applications are not configured for voice input. These applications can be configured to receive voice input or data entry using a voice overlay. A voice overlay program substitutes spoken words for keyboard strokes, mouse clicks, or the like. Thus, the overlay programs interacts with the application as though the CSR was typing data using a keyboard, for example. Emulation of user input, such as, for example, keystrokes, is common programming technique and is used in, for example, embedded JavaScript code, Netscape's LiveConnect, and the like. Voice input and speech recognition are available from many sources, such as, for example, International Business Machines Corporation (IBM), LumenVox, Microsoft, Nuance, and the like.

To create the overlay program, the programmer write scripts, such as, Voice XML fragments, to describe what the speaker may say for each targeted action on the screen. The voice overlay takes the results of the VoiceXML interpretation and programmatically acts as if keystrokes or the like were entered by, for example, setting the value of the corresponding form element in the screen, navigating to the desired destination, etc.

Using the voice overlay can be accomplished in a number of different ways. For example, the CSR may speak directly to the application through the overlay program. As desired, the CSR may toggle the audio to be directed either to the customer or the application as desired. Such toggling may be similar to a push-to-talk radio toggle. In this case, for example, keying the headset may cause the audio to be directed to the application whereas normal, non-keyed audio is directed to the customer.

Thus, with the toggled communication, the CSR may request a part or serial number. The customer would being providing the information. The CSR would substantially simultaneously toggle or key the system so the CSR audio is directed to the application. The CSR would repeat the information and the voice overlay directs the CSR audio to the voice platform for recognition. Again, the audio may be toggled such that the audio from the CSR is "heard" only by the voice platform or is "heard" by both the voice platform and the customer. Alternatively, the CSR could direct the audio input from the customer directly to the voice platform. In other words, the overlay has a great deal of flexibility in implementation. For example, the overlay may or may not allow the customer to hear what the CSR inputs into the application. Moreover, toggling using a key button, or switch, allows implementation of the overlay without significant hardware changes for the CSR workstation. However, conventional telephones may need to be upgraded with an interface to allow conversion of the audio into a format usable by the voice platform. The interface may be, for example, a media gateway or VoIP card.

While many configurations will be apparent to one of ordinary skill in the art, for convenience and simplicity, the following description is provided assuming the application is presented as a collection of web pages using a combination of HTML, JavaScript, and Java applets. One of ordinary skill in the art will recognize on reading the disclosure that other browser protocols, such as, ActiveX, Toolbars, and the like, could be used. Moreover, while described in a web based environment, one of ordinary skill in the art will now recognize that other operating environments are possible, such as, for example, desktop applications, client applications executed in Windows or Linux operating systems, or the like. In this configuration, the application typically runs on a desktop at a CSR workstation. The application collects data through HTML forms that are submitted to an application server for processing by the application. Once processed a new page is returned to the CSR workstation with the data.

In the above described environment, the voice overlay's voiceXML scripts may be deployed to the server hosting the applications or remotely as a matter of design choice. In operation, the voice platform would run the voiceXML scripts on an as needed basis whenever a new page is displayed or display is refreshed. While the voice overlay control module could be an application separately loaded at a CSR workstation, it also may be downloaded whenever the applications are downloaded or refreshed to the workstation. For example, when a customer call is forwarded to the CSR or agent, the voice overlay control module may be downloaded with the initial CSR web screen for the particular call. This is especially beneficial as many CSRs today are contracted by several companies that may all require different voiceXML scripts to function.

Figure 1:
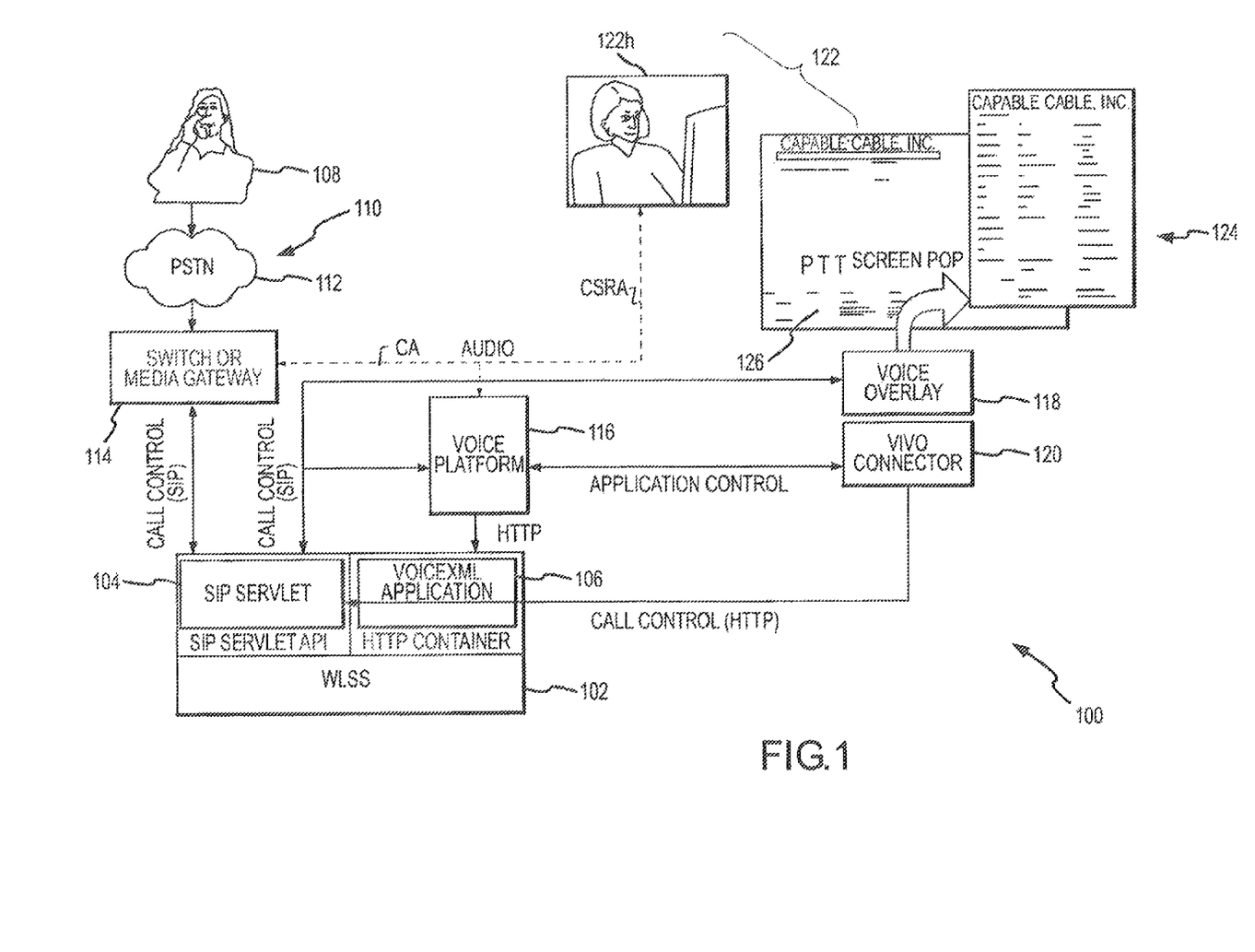
FIG. 1 is a functional block diagram of a call center environment constructed in accordance with the technology of the present application.

Referring now to FIG. 1, a functional block diagram of a call center environment 100 is provided. While shown as a software environment, one of ordinary skill in the art will now recognize that environment 100 may be created using largely software components, hardware components, a combination thereof, or the like. Environment 100 includes, among other things, an application server 102. Application server 102 may support various internet communication protocols, such as, for example, session initiation protocols 104 and hypertext transfer protocols 106. Application server 102 is connected to a customer 108 via a communication link 110. If customer 108 is using a VoIP compatible connection, communication link HO may be direct from customer 108 to application server 102 via a network 112. If customer 108 is using a conventional telephone line communication link 110 may include a media gateway 114, and network 112 would be a conventional PSTN network. A voice platform 116 connects the voice overlay scripts 118 and connector 120 to the workstation 122. Workstation 122 may be a conventional personnel computer or the like with a processor, BIOS, and display system. Voice platform could be, for example, a voice platform as available from SandCherry, Inc. and the connector could be a Vivo connector.

In operation, a customer calls into the application server 102 to start a session with SIP 104. The workstation 122 provides a screen 124 on a display and provides voice overlay 118 having executable scripts to workstation 122. Voice overlay 118 scripts would be executable by the processor of workstation 122. The voice overlay causes the voice platform 116 to load voiceXML from application server 102. The CSR toggles the voice overlay using a toggle key 126. Toggle key 126 may be a manual switch, a GUI interface as shown, a hotkey on a workstation keyboard, a voice tap (as explained further below) or the like. The voice overlay 118 uses the connector 120 to direct audio input, as shown from the CSR but could be configured for direct input from the customer, to the voice platform 116, which processes the audio and returns data formatted for the application server for input into the appropriate fields. If the direct audio is from the CSR to the voice platform, the voice platform 116 may disconnect the audio (i.e., mute) from the CSR to the customer. Thus, depending on configuration, when the CSR prompts the customer for the customer's phone number, for example, the customer may state 555-1234 which is directly input into appropriate fields 130 on the screen 124 or the CSR may repeat the information for input with the audio to the customer muted.

While generally described in an environment that functions well, one of ordinary skill in the art would now recognize that incoming calls may be conventional PSTN calls, TDM calls, VoIP calls, or the like. Moreover, the workstation may provide a conventional telephone for the CSR, a TDM, a VoIP, or a soft phone.

Toggle key 126 allows the CSR, or any participant having toggle key 126, to direct the audio output of the handset as needed. Thus, when needed, the CSR can direct the audio output from CSR workstation 122, which includes a headset or handset (microphone and speaker set) 122h, to the voice application that automates keystrokes or input for the operator. In effect, when the call is set up between the customer and the CSR, the toggle key 126 operates as a "spigot" of sorts to direct the audio between the customer, agent, and voice platform.

When the customer is connected to the CSR, the customer is connected to the server 102, also known generically as the Back-to-Back-User-Agent (B2BUA). The server 102 sends, for example, a sip invite to the CSR workstation communication device, such as a VoIP compatible telephone. In other words, three participants for a customer service session include on the signaling path, the customer (and the customer communicating device such as a telephone), the server, and the CSR workstation device. The B2BUA or server directs the audio and the session connections. The B2BUA is connected to the CSR workstation, such as the phone, via an HTTP connection to the voice overlay's Control Module, which can send commands (over HTTP) to direct the audio to the voice platform. Initially, the audio path runs between the Customer 108 and CSR 122 communication device (i.e., for example, a conventional telephone to telephone connection).

Ideally, at substantially the same time as the call path between the Customer Phone and CSR workstation is being set up, there is a loaded at the CSR's workstation, which may be a desktop computer, the starting web-page of the application. When the web-page downloads to the browser, it includes an instance of the voice overlay including the toggle key 126 and an overlay control module. The control module may be executed from a Java applet or the like, which issues commands to the B2BUA (via HTTP) and the Voice Platform via the control channel. One of the commands is "connect to voice platform" that initiates an application session on the Voice Platform (similar to a caller being connected with a conventional IVR platform). Another command is "load VXML script", which requests that the Voice Platform load a particular VXML script, and set that script for execution. This command can also be used in a programmatic manner to set various VXML scripts for execution on the Voice Platform as the Agent navigates the CRM application. For example, the voice overlay might choose to provide a re-sync of the visual and voice user-interfaces whenever a new web-page is downloaded. Or the voice overlay might change the active VXML script when a user tabs from one field to field in a HTML form element on a single web-page. As regards our invention, the Control Module also issues commands for "start transmission" and "stop transmission", corresponding to the Agent pressing and releasing the virtual Transmit Key. The start/stop commands are sent via HTTP to the B2BUA, which (in turn) signals to the relevant devices (phones, switches, media gateways, etc.) to divert the agent's outgoing audio to the Voice Platform, so that the VXML application can recognize what the Agent says and return the result(s) back to the Control Module via the Control Channel. After which the Control Module programmatically simulates the Agent using the web user interface to enter the same data or navigate to the specified location.

From the foregoing description, it will now be apparent to one of ordinary skill in the art that the control of the audio between the customer, CSR, and voice platform may be accomplished in many ways. For example, the CRM application and the voice overlay's control module may be implemented in native code for the platform (e.g., Win32), rather than as a web application. The customer and CSR communication devices may be conventional or VoIP. If the Call Center's switch is already VoIP enabled, there may be no need for a media gateway. Conversely if the switch uses conventional circuit switching, it may be necessary to install a VoIP card in the switch, or install an external media gateway.

The following call flow scenarios illustrate three of many possible different scenarios. In the call flow diagrams below, the "VIVO Client" label corresponds to the Control Module and the "PTT Button" label corresponds to the Transmit Key in the foregoing description of the invention.

Scenario 1—PSTN Caller Connected to SIP Agent

Figure 2:
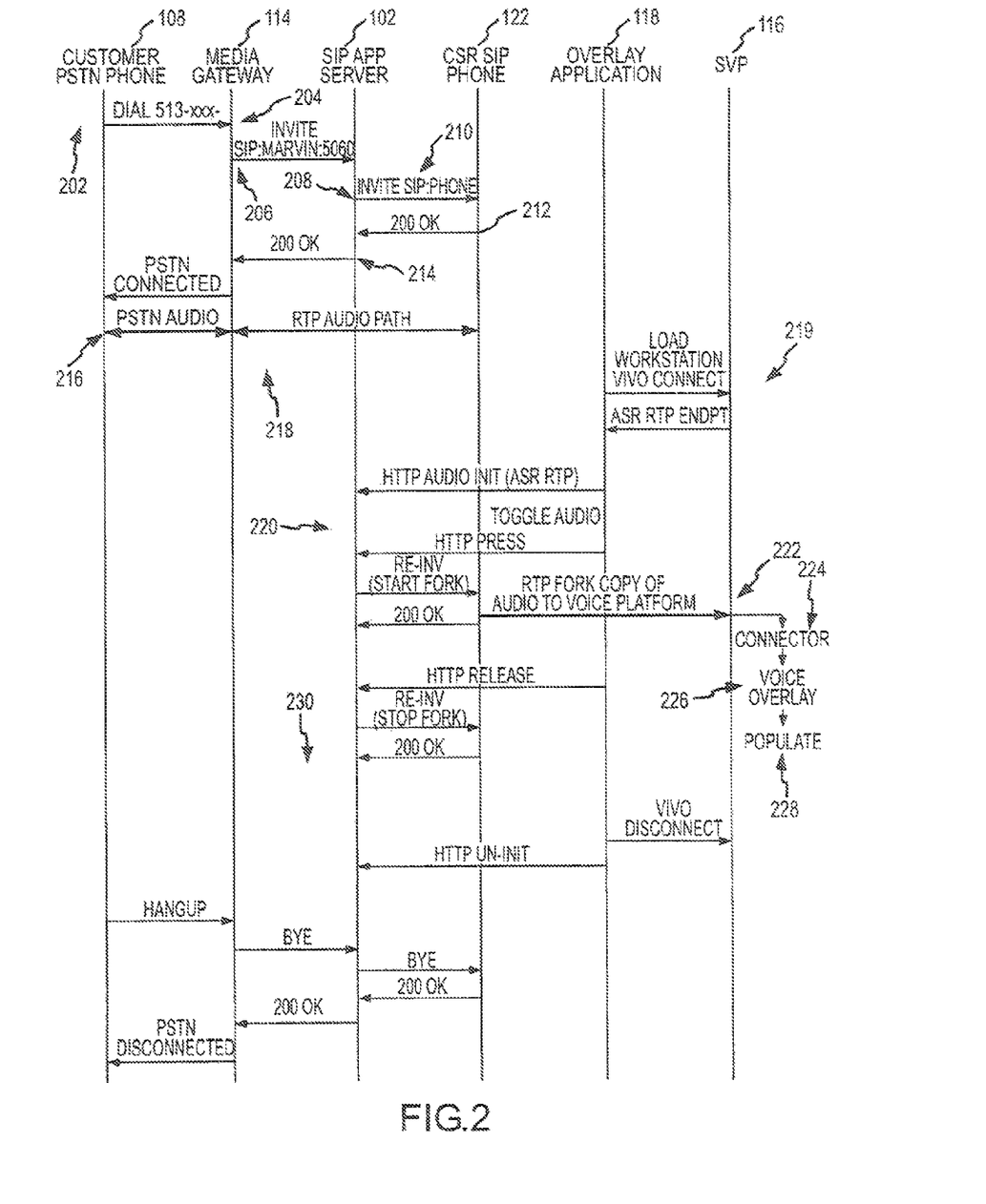
FIG. 2 is a timing diagram illustrating a call and information flow associated with a call center environment of FIG. 1.

Referring now to FIG. 2, a scenario involving a PSTN caller speaking to a CSR on an IP network. The CSR can be using a SIP-based hardware phone or a SIP-based software phone. This scenario includes the following logical components:

Customer PSTN phone;
Media Gateway;
SIP Application Server;
CSR SIP Phone;
Overlay Application running on Desktop Computer; and
Voice Platform.

In the scenario shown in FIG. 2, the customer 108 places a call using a conventional telephone over the PSTN 112, step 202. The call is received at media gateway 114, step 204, that sends a SIP invite to application server 102, step 206. Application server 102 identifies an appropriate CSR 122, step 208, and sends a SIP invite to CSR 122, step 210. The selected CSR 122 sends a SIP acceptance to application server 102, step 212, which sends a corresponding acceptance to media gateway 114, step 214. While not explained herein, one of ordinary skill in the art on reading the disclosure would now recognize that media gateway 114 may be connected to several application servers and application server 102 may be connected to several different CSRs. Thus, if the first selected server or CSR is unable to accept the call, a SIP rejection would be returned prompting the media gateway and/or server to send the invite to the next available server or CSR until a connection is established or a busy signal or message is returned to the customer.

In any event, once the CSR is selected and the SIP acceptance (or OKs) are returned, the media gateway 114 completes the PSTN connection, step 216, and establishes the audio path between the customer, the media gateway, the server, and the CSR, step 218. In a sense, the connection is similar to 3 or more calling with the customer 108, the server 102 and voice platform 116, and the CSR 122 being three separate parties.

The CSR workstation screen 124 is loaded with the voice overlay application, step 219. As mentioned above, in conventional operation, a CSR may prompt a customer for a telephone number. Conventionally, the customer would state "555-1234" and the CSR would type that into the appropriate field on screen 124. Using the present technology, the CSR 122 may prompt the customer 108 for information, such as, for example, a telephone number. Substantially on completion of the request or at least prior to the customer responding, CSR 122 would activate toggle switch 126, step 220, to direct audio to voice platform 116. The audio signal may be customer audio (CA) or customer service representative audio (CSRA). Voice platform 116 receives the direct audio, step 222, and transmits appropriate signals to VIVO connector 120 and application server 102, step 224. Voice platform 116 converts the audio to a proper signal format and inputs the formatted signals to voice overlay 118, step 226, and voice overlay 118 uses the signals to populate the appropriate fields on screen 125, step 228. As shown in the diagram, but not outlined above as it is generally understood in the art, the voice platform, audio input, VIVO connector and voice overlay would need to accomplish the appropriate handshaking protocols. Once the customer call is completed, the call is terminated in a conventional manner, step 230.

As mentioned above, toggle switch 126 directs audio to voice platform. The audio may be from customer 108 or from CSR 122 repeating the spoken words of customer 108. If CSR 122 is repeating customer 108, activating toggle switch 126 at step 220 performs the additional function of muting the audio connection between customer 108 and CSR 122. The muting can be a temporary disconnection of the signal path or other conventional muting technologies.

Scenario 2—SIP Caller Connected to PSTN Agent

Figure 3:
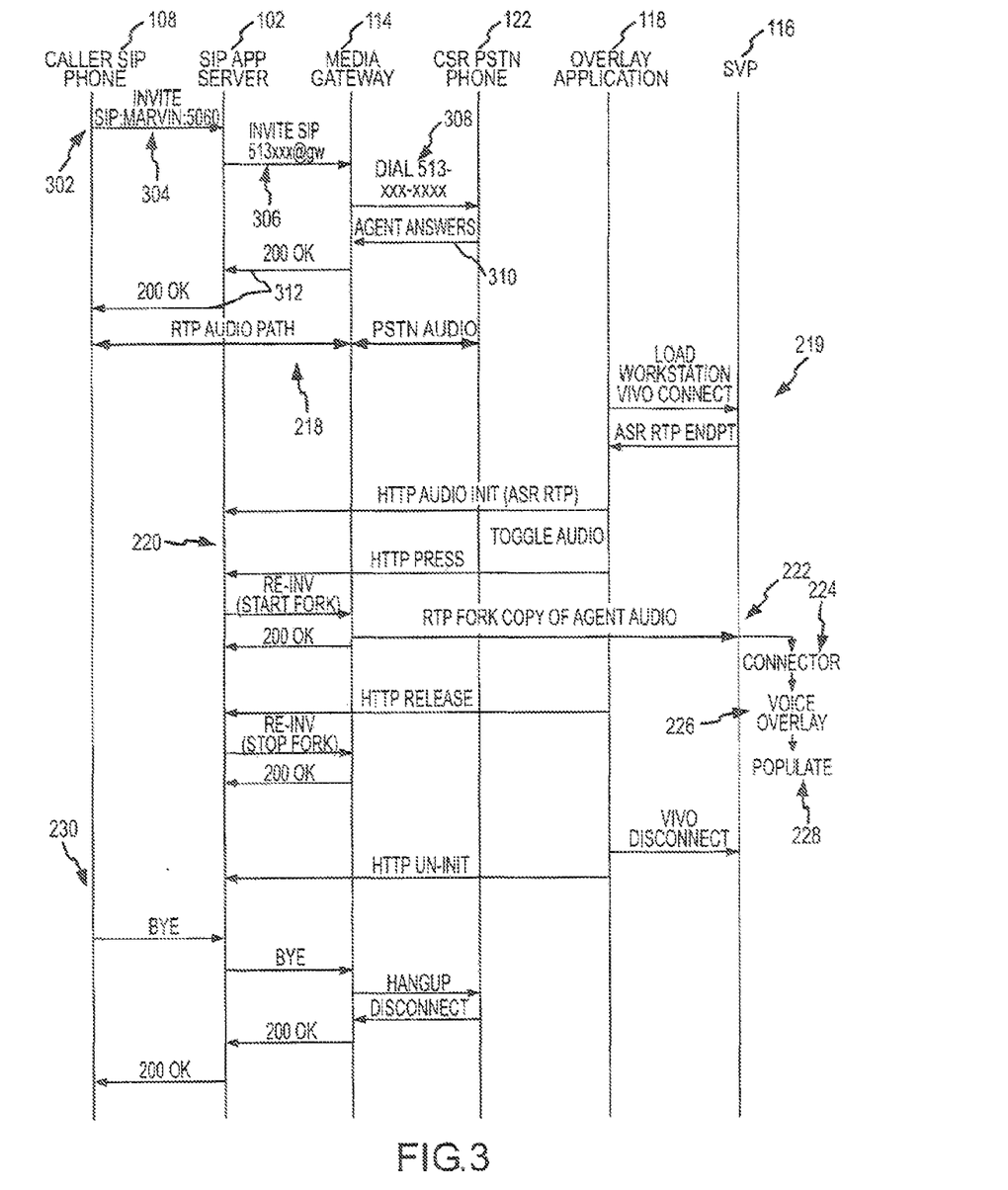
FIG. 3 is another timing diagram illustrating a call and information flow associated with a call center environment of FIG. 1.

Referring now to FIG. 3, a scenario involving a SIP caller speaking to a CSR on a PSTN phone. The caller can be using a SIP-based hardware phone or a SIP-based software phone. This scenario includes the following logical components:

Caller SIP phone;
SIP Application Server;
Media Gateway;
CSR PSTN Phone;
Voice Overlay Application running on Desktop Computer; and
Voice Platform.

In scenario 2, customer 108 is connected via network 112 directly to application server 102, step 302. The customer 108 phone sends a SIP invite to the application server 102, step 304. The application server 102 sends a corresponding SIP invite to media gateway 114, step 306, which dials the CSR 122 telephone, step 308. The CSR 122 answers the phone, step 310, which causes the appropriate SIP invite acceptances, step 312. Once accepted, the audio path is established, step 218. Once the audio is established, the procedure is essentially the same as the above described flow diagram 200.

In this instance, for audio from CSR 122 to populate fields on screen 124, the CSR 122 audio is transferred to the voice platform via the media gateway. Otherwise, the remaining steps of the procedure are similar to scenario 1.

Scenario 3—PSTN Caller Connected to PSTN Agent

Figure 4:
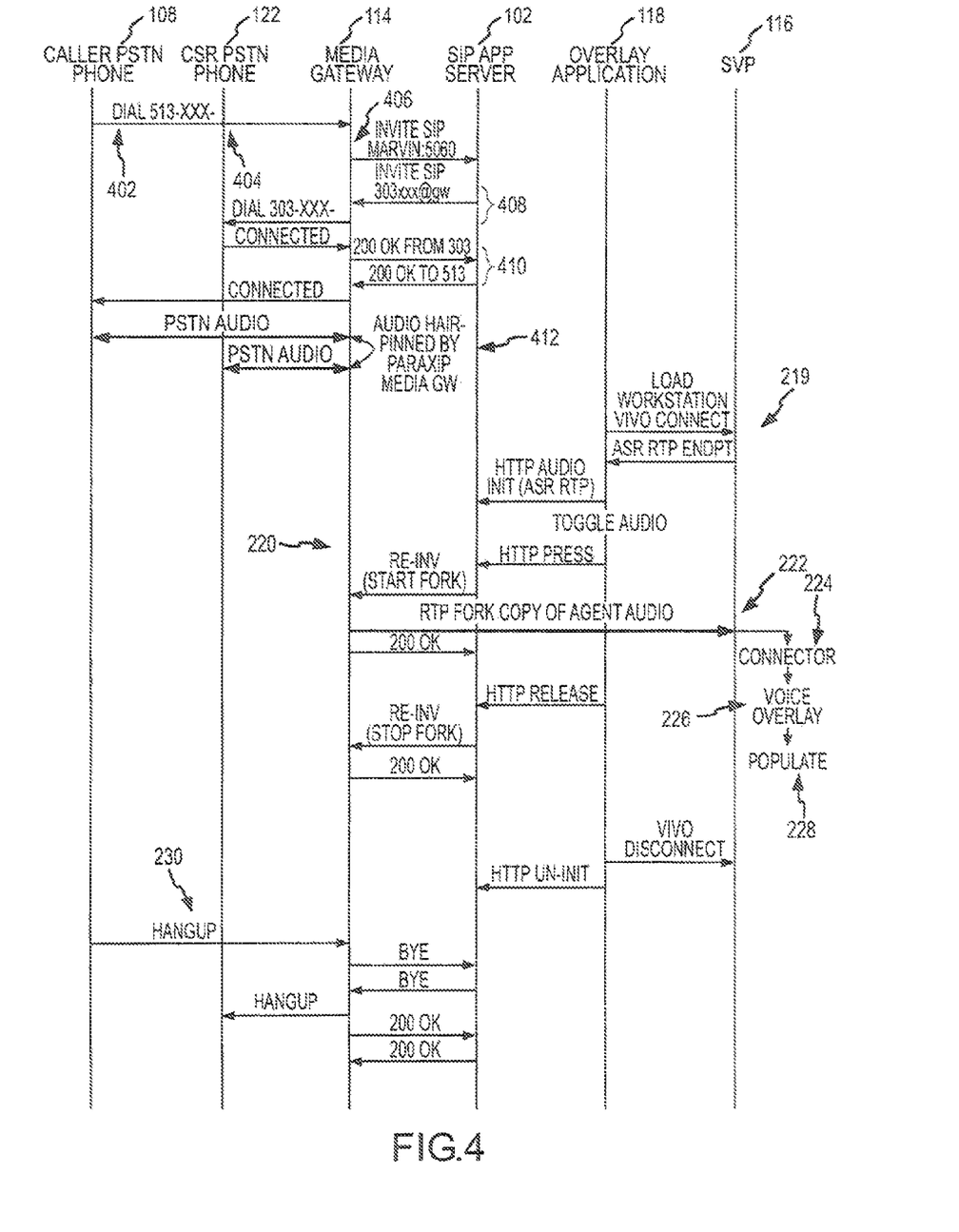
FIG. 4 is yet another timing diagram illustrating a call and information flow associated with a call center environment of FIG. 1.

Referring now to FIG. 4, a scenario involving a PSTN caller speaking to a CSR on a PSTN phone. This scenario includes the following logical components:

Caller PSTN phone;
Media Gateway;
SIP Application Server;
CSR PSTN Phone;
Voice Overlay Application running on Desktop Computer; and
Voice Platform.

The connections for scenario 3 are arranged, slightly different, but once established operation of the environment is essentially the same as described above. First, customer 108 calls CSR 122 directly over a PSTN network, step 402. The CSR dials a media gateway 114, step 404, that sends an invite to application server 102, step 406. The application server and media gateway accept the invites, step 408, and call handshaking is accomplished, step 410. The handshaking connects customer 108, media gateway 114, and CSR 122, step 412. Once connected, operation of the environment is as described above.

As can be appreciated, the connection of audio between customer 108 and CSR 122 can be connected directly through media gateway 114 without connecting application server 102. In this case, application server 102 is only connected when toggle switch 126 is activated.

While the above described flow diagrams relates to populating editable data fields, one of skill in the art would understand on reading the disclosure that the voice commands may be used to navigate through the editable fields as well as load separate web pages or launch new windows. For example, to enter the phone number, the CSR may speak "phone number 555-1234; home address 1 Main Street USA Town USA," which would provide the voice overlay an identifier for the editable field for which the information is being supplied as well as the data to be entered. As shown, the "phone number" prompt would cause the voice overlay to use "555-1234" to update the phone number data field. The "home address" prompt would cause the voice overlay to use "1 Main Street USA Town USA" to update the home address data field, etc. Pauses between statements or commands, such as "stop," may be used to indicate new information. Similarly, the updates may be over various pages. Thus, the CSR may state, page 1 to load CRM page 1, page 2 to load CRM page 2, etc. While described as being spoken by the CSR, any audio may be used.

Figure 5:
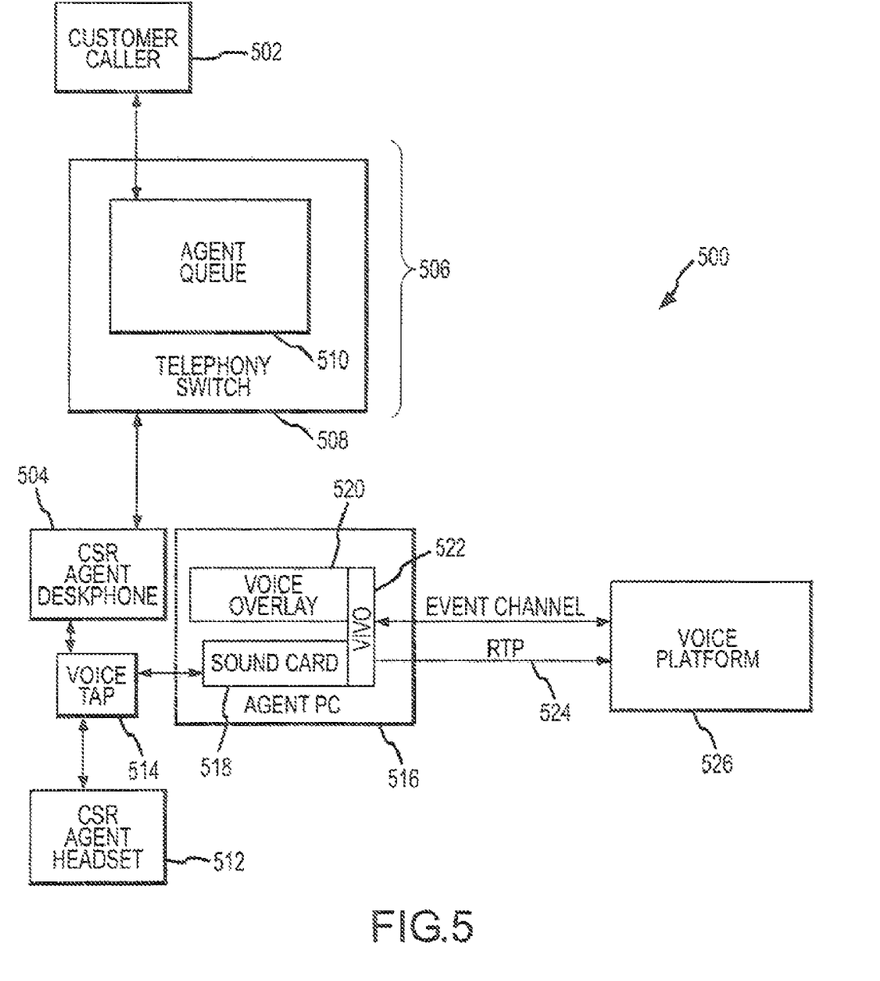
FIG. 5 is a functional block diagram of another call center environment constructed in accordance with the technology of the present application.

Referring now to FIG. 5, a call center environment 500 is provided. As shown in FIG. 5, call center environment has a customer 502 connected to a CSR deskphone 504 through an appropriate communication network 506. Typically such a connection will be using a conventional PSTN connection, but could be any conventional network including, for example, a private network, a VoIP network, a Cellular network (analog or digital), other wired networks, other wireless networks, or the like. The communication network 506 may have a switch 508 with an agent queue 510 to hold calls until a CSR phone 504 becomes available. The CSR is connected to the CSR deskphone 504 by a conventional CSR headset 512, which may include a microphone and a speaker. CSR headset 512 may be a conventional telephone handset. Connected between deskphone 504 and headset 512 is a voice tap 514. Voice tap 514 acts to direct audio from headset 512 between deskphone 504 and headset 512 and/or a CSR workstation 516. Workstation 516 has a sound card 518 to provide an interface and conversion of the audio signal to a signal usable by the computer. Workstation 516 also has a voice overlay loaded 520 (or previously installed) with the particular workstation display. A connector 522, shown as a VIVO connector, connects via data connection 524 workstation 516 with a voice platform 526. Voice platform may be locally connected or remotely connected via an internet connection.

Figure 6:
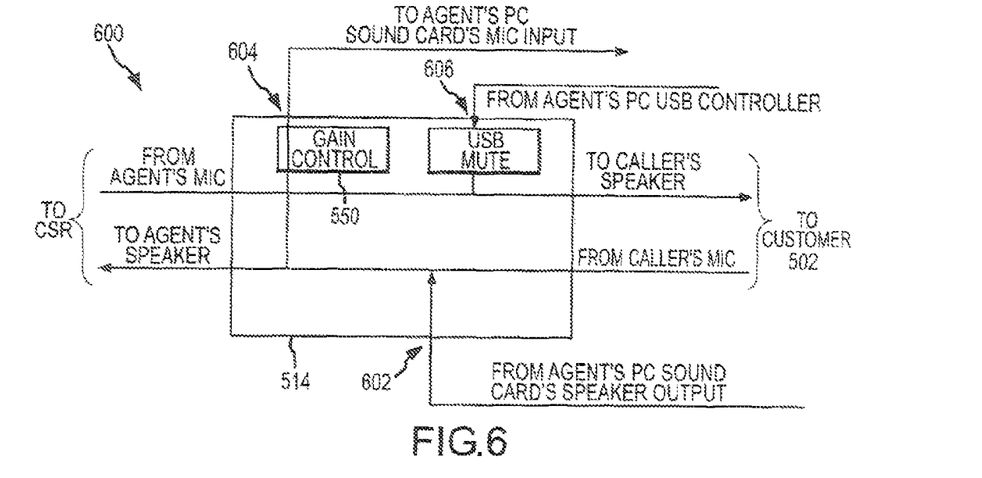
FIG. 6 is a connectivity diagram of the environment shown in FIG. 5 in a conference mode.
Figure 7:
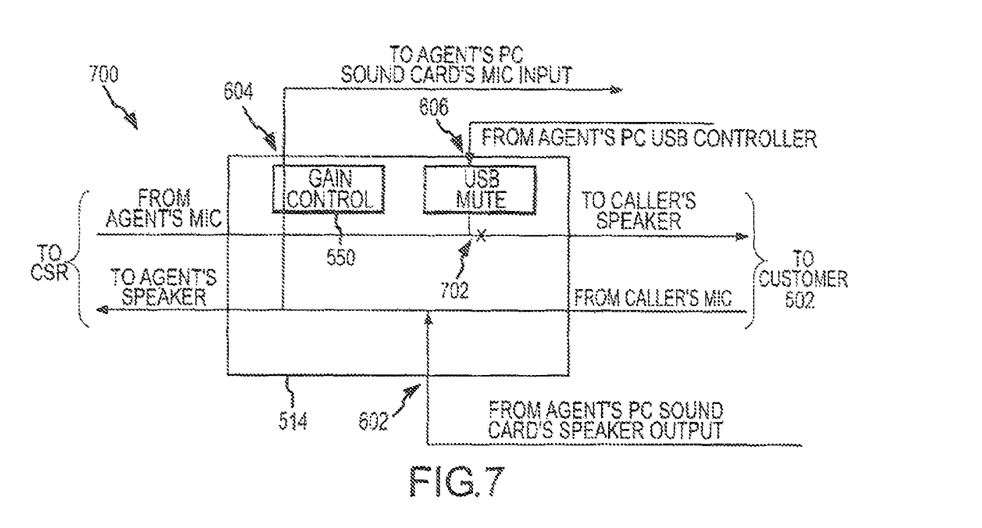
FIG. 7 is a connectivity diagram of the environment shown in FIG. 5 in a mute mode.

Referring now to FIG. 6, a call flow is shown in a conference mode 600 of operation. As shown, voice tap 514 is provided between deskphone 504 and headset (or handset) 512 using a standard telephony connection. In other words, voice tap 514 provides lines to carry the audio coming from the CSR microphone as well as deliver audio to the CSR speaker. Voice tap 514 also provides a PC audio output connector 602, a PC audio input connector 604 and PC universal serial bus (USB) control 606. Referring now to FIGS. 5-7, use of the voice tap will be explained in an exemplary embodiment. First the agent establishes a connection to the application, which would include downloading or initiating any voice overlays. The CSR eventually requests information from the customer that may populate or be directly input to the workscreen. The CSR may use a toggle to conference the workstation into the into the conference. The toggle may be a graphical user interface toggle that is "clicked" on the workstation, which would cause the workstation (which may be a personal computer) to issue a command to the voice tap to provide audio from the customer to the workstation. For more information regarding the signal from the workstation, see co-pending U.S. patent application Ser. No. 10/906,363, titled METHOD AND APPARATUS TO ALLOW TWO WAY RADIO USERS TO ACCESS VOICE ENABLED APPLICATIONS, filed Feb. 17, 2005, incorporated herein by reference as if set out in full. Once provided, the voice overlay would cause scripts to execute to populate the various fields. Releasing the toggle deactivates the conference mode disconnecting the workstation from the customer supplied audio. In this mode, the CSR still hears the customer as the audio is directed both to the CSR and the workstation. While this is not necessary, it is preferable so the CSR will know when the customer ceases communicating.

In some cases, the CSR will use audio to input data to the workstation screen. While the customer may be connected to the line, which would function similar to the above but the voice tap would connect the CSR microphone to the PC audio input connector, frequently the CSR elects to mute the connection to the customer so the customer does not hear the CSR. In this case, the toggle would simultaneously provide control signal to USB control 606 to open a disconnect 702 in the audio from the CSR's microphone to the customer speak line. This may generally be referred to as a mute mode 700 of operation. Other than disconnect 702 the function is essentially the same as conference mode.

Voice tap 514 optionally includes a gain control 550. Gain control 550 allows leveling the audio from either the CSR or the customer to avoid saturation or clipping of loud audio as well as loss from audio to soft from being ignored. Also the audio from the PC sound card is optional to allow the voice overlay to communicate.

While the invention has been particularly shown and described with reference to some embodiment thereof, it will be understood by those skilled in the art that various other changes in the form and details may be made without departing from the spirit and scope of the invention.

What is claimed is:

1. A method for a customer service representative to populate at least one customer relationship management application editable data field at a customer service representative workstation data using audio input, performed on a processor, comprising the steps of:
   establishing a communication link between a customer service representative workstation and a voice platform;
   activating a toggle to direct an audio signal from the customer service representative to a voice platform over the communication link;
   directing the audio signal from the customer service representative workstation to the voice platform wherein the audio signal is converted at the voice platform into a workstation usable signal comprising data usable to populate at least one editable data field; and
   receiving the workstation usable signal at the customer service representative workstation over the communication link; such that the customer relationship management application populates the at least one editable data field from the customer relationship management application with data from the workstation usable signal.

2. The method of claim 1, wherein the step of activating the toggle further comprising the step of muting the customer service representative audio signal so the customer does not receive the customer service representative audio signal.

3. The method of claim 1, wherein the step of activating the toggle further comprises the step of pressing or releasing a hotkey.

4. The method of claim 1, wherein the step of activating the toggle further comprises the step of clicking or clicking and releasing a graphical user interface toggle display.

5. The method of claim 1, wherein the step of activating the toggle further comprises the step of generating a command to a voice tap to operably connect the customer service representative audio signal to the workstation and to operably disconnect the customer.

6. A method for a customer service representative to populate at least one customer relationship management application editable data field at a customer service representative workstation data using audio input, performed on a processor, comprising the steps of:
   providing a communication link between a customer service representative workstation and a voice platform;
   receiving at the voice platform an audio signal from the customer service representative workstation wherein the audio signal is generated from a customer service representative;
   converting the audio signal generated by the customer service representative into a textual data signal representative of the audio signal that is usable by a customer relationship management application resident on the customer service representative workstation; and
   transmitting the textual data signal usable by the customer relationship management application to the customer service representative workstation such that the customer relationship management application uses the textual data signal to populate at least one editable data field in the customer relationship management application with text from the textual data signal subsequent to termination of a call from a customer.

7. A customer service environment comprising:
   a customer service representative workstation including a customer service representative headset operably connected to an audio communication network to receive audio communications from a customer service representative and a processor operably connected to an application server to receive the customer relationship management application and a display to display a customer relationship management application having editable data fields;
   a toggle switch to selectively couple the audio communication network to the processor; and
   the processor operably connected to a voice platform, such that when the processor is coupled to the audio communication network the processor directs audio from the customer service representative headset to the voice platform that converts the audio from the customer service representative into converted audio comprising data in a format compatible with the customer relationship management application and the processor receives the converted audio data and populates at least one of the editable data fields.

8. The customer service environment of claim 7, wherein the toggle switch is selected from a group of switches comprising: a hotkey or a selectable icon on a graphical user interface.

9. The customer service environment of claim 7, further comprising an interface between the customer service representative headset and the audio communication network.

10. The customer service environment of claim 9, wherein the interface comprises a deskphone.

11. The customer service environment of claim 9, wherein the toggle switch comprises a voice tap between the customer service representative headset and the interface.

12. The customer service environment of claim 11, wherein the voice tap selectively connects audio communication from the customer service representative to the voice platform.

13. The customer service environment of claim 11, wherein the voice tap selectively connects audio communication from the customer service representative to the voice platform and disconnects audio communication from the customer service representative to the customer.

14. The customer service environment of claim 7, wherein the processor is operably connected to the voice platform such that the customer service representative can navigate to other screens with the converted audio.

15. The customer service environment of claim 7, wherein the processor receives a voice overlay to allow the customer service representative to interact with the customer relationship management application using audio.

* * * * *